United States Patent
Harkins

(10) Patent No.: US 7,382,228 B2
(45) Date of Patent: Jun. 3, 2008

(54) METHODS AND APPARATUS FOR IDENTIFYING ELECTRONIC SHELF LABELS WITH WHICH COMMUNICATION HAS BEEN LOST

(75) Inventor: Cheryl Kay Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 168 days.

(21) Appl. No.: 11/285,345

(22) Filed: Nov. 22, 2005

(65) Prior Publication Data

US 2007/0115126 A1 May 24, 2007

(51) Int. Cl.
*H04Q 6/22* (2006.01)
(52) U.S. Cl. .................. 340/10.1; 340/572.1; 340/5.91
(58) Field of Classification Search .. 340/572.1–572.9, 340/539.1, 10.1–10.6, 5.91, 825.49, 825.52
See application file for complete search history.

(56) References Cited

U.S. PATENT DOCUMENTS

| | | | | |
|---|---|---|---|---|
| 5,151,684 | A * | 9/1992 | Johnsen | 340/568.1 |
| 5,198,644 | A * | 3/1993 | Pfeiffer et al. | 235/383 |
| 5,448,226 | A * | 9/1995 | Failing et al. | 340/5.91 |
| 5,537,126 | A * | 7/1996 | Kayser et al. | 345/2.1 |
| 5,548,282 | A * | 8/1996 | Escritt et al. | 340/5.91 |
| 5,604,923 | A * | 2/1997 | Wilkus | 455/67.7 |
| 5,635,915 | A * | 6/1997 | Gray | 340/825.57 |
| 5,704,049 | A * | 12/1997 | Briechle | 715/744 |
| 5,841,365 | A * | 11/1998 | Rimkus | 340/5.61 |
| 6,552,663 | B2 * | 4/2003 | Swartzel et al. | 340/572.1 |
| 6,570,492 | B1 * | 5/2003 | Peratoner | 340/310.11 |
| 6,762,674 | B2 * | 7/2004 | Matsushita | 340/5.91 |
| 6,992,567 | B2 * | 1/2006 | Cole et al. | 340/10.1 |
| 7,095,325 | B2 * | 8/2006 | McDonald et al. | 340/572.1 |
| 7,152,040 | B1 * | 12/2006 | Hawthorne et al. | 705/16 |
| 2001/0028300 | A1 * | 10/2001 | Matsushita | 340/5.91 |

FOREIGN PATENT DOCUMENTS

| | | |
|---|---|---|
| EP | 0 096 414 A2 | 11/1990 |
| EP | 0 875 872 A2 | 11/1998 |
| EP | 1 107 154 A2 | 6/2001 |
| WO | WO 90/13067 | 11/1990 |

* cited by examiner

*Primary Examiner*—George A Bugg
*Assistant Examiner*—Hoi C Lau
(74) *Attorney, Agent, or Firm*—Priest & Goldstein, PLLC

(57) ABSTRACT

Systems and techniques for calling attention to loss of communication with an electronic shelf label. One or more of a plurality of labels deployed in a location may be programmed with a message to be displayed or an action to be taken if communication is lost. The labels may be programmed with a scheduled action that will cause a label to take the programmed action or display the programmed message if communication with the label does not occur by a specified time. Communication with the label causes the action or event to be rescheduled.

17 Claims, 4 Drawing Sheets

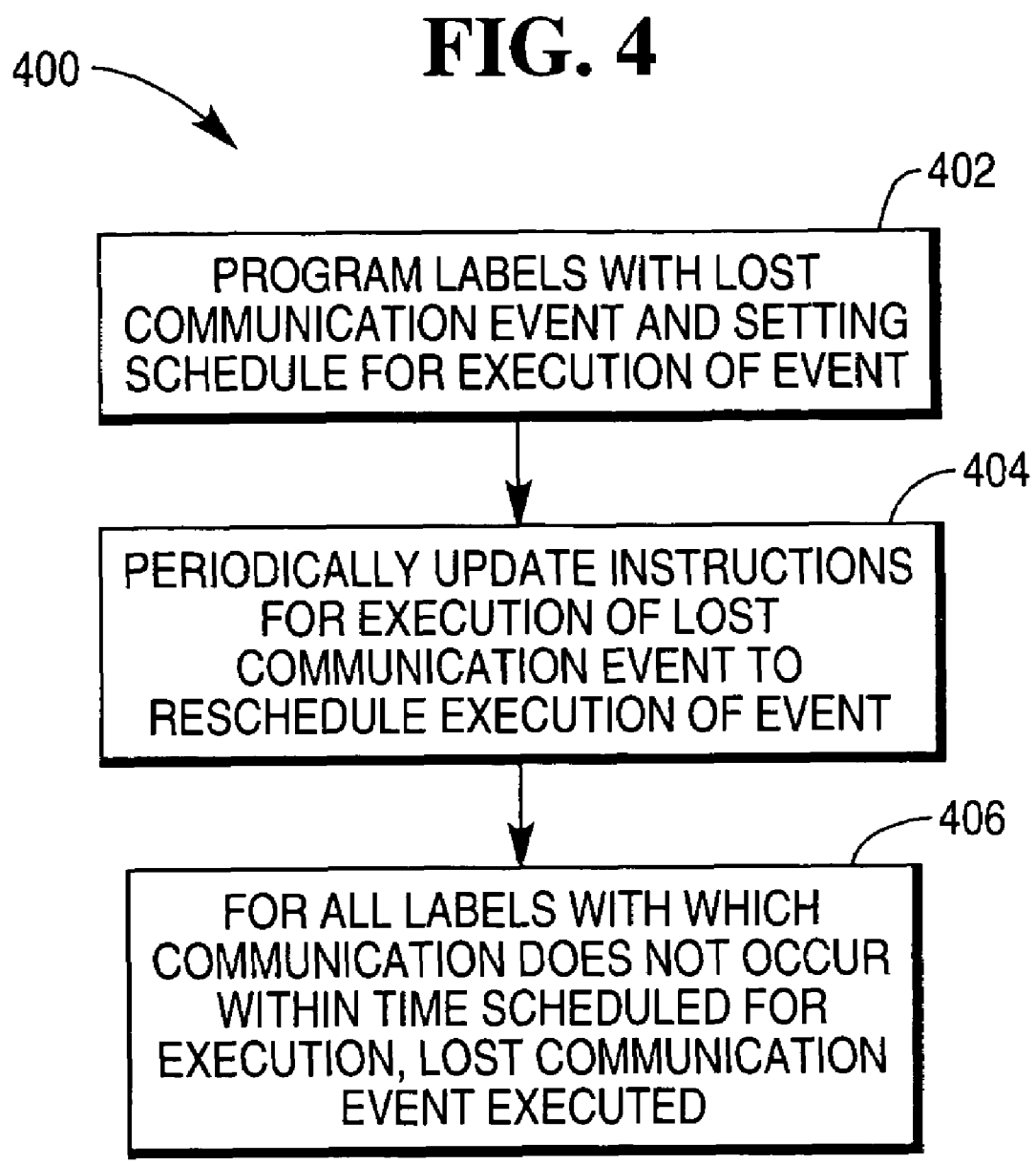

METHODS AND APPARATUS FOR IDENTIFYING ELECTRONIC SHELF LABELS WITH WHICH COMMUNICATION HAS BEEN LOST

FIELD OF THE INVENTION

The present invention relates generally to improvements to electronic shelf labels (ESLs) for display of pricing and other desired information for goods. More particularly, the invention relates to improved systems and techniques for identifying ESLs with which communication has been lost.

BACKGROUND OF THE INVENTION

ESLs provide a convenient way to display prices and other relevant information about goods. A retail location may have hundreds or thousands of ESLs that receive pricing and other information transmitted by a communication base station. The communication base station provides an interface between a central server and the ESLs.

Each of the ESLs is typically identified by a serial number and transmissions to the ESL often use its serial number as an address, while transmissions from the ESL use the serial number as an identifier. The server hosts a database including the serial number of each ESL and data stored in each ESL. An ESL may be updated by storing updated data in the database and issuing a command to the server to transmit the updated data to the communication base station for transmission to the ESL. Data stored in an ESL is updated when an entry for an ESL changes in the database. For example, an update may be made if a price change for a product occurs. In addition, new transmissions may be made to all ESLs or a selection of ESLs on a periodic schedule, in order to help insure that the data stored in the ESL reflects the data in the database.

It is possible for an entry for an ESL to be inadvertently removed from the database. For example, an ESL may be removed from a shelf, but the entry for a different ESL is deleted from the database. In such a case, the ESL whose entry was deleted will not be updated and if the pricing or other information changes for the products associated with the ESL changes, the ESL will display incorrect information. A large number of ESLs are typically deployed in a given location, such as a retail store or supermarket, and the results of a failure of communication are not immediately obvious, consisting as they do essentially of a mismatch between stored information and information displayed on an ESL. It may therefore be difficult in typical prior art systems to identify ESLs with which communication has failed.

SUMMARY OF THE INVENTION

Among its several aspects, the invention recognizes a need for systems and techniques for identifying an ESL with which communication has been lost. According to one aspect of the present invention, a plurality of electronic shelf labels is deployed in a location. Each of the labels at the time of deployment or later is suitably programmed to execute a lost communication action if communication with the label does not occur within a predetermined time. Examples of actions that may be executed include display of an appropriate message, sounding of a tone or illumination of a light emitting diode (LED). Suitably, execution of the lost communication action is scheduled to occur at a specified time or after the expiration of a specified period. Before the scheduled time for execution of the lost communication action, a message can be communicated to each label to update the schedule for execution of the action, and thereby set a later time for execution. Such updating is typically performed at regular intervals, in each case before the new updated time for execution of the lost communication action. Thus, if communication can be conducted with a label, the lost communication action will never be executed. However, if communication with a label fails, the lost communication action will be executed according to the most recently updated schedule.

A more complete understanding of the present invention, as well as further features and advantages of the invention, will be apparent from the following Detailed Description and the accompanying drawings.

BRIEF DESCRIPTION OF THE DRAWINGS

FIG. 4 illustrates a process of identifying electronic shelf labels with which communication has been lost according to an aspect of the present invention.

DETAILED DESCRIPTION

Figure 1:
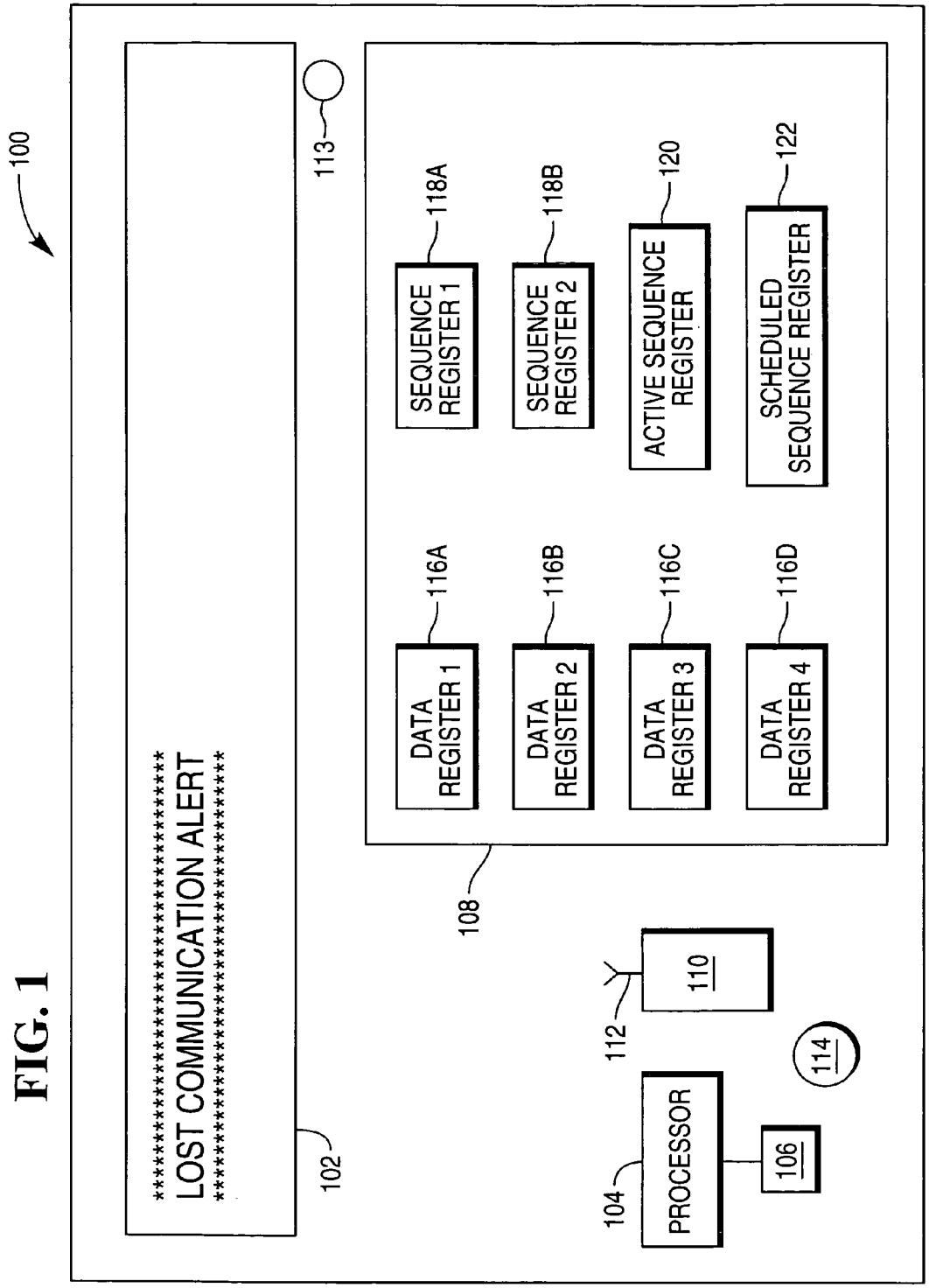
FIG. 1 illustrates an electronic shelf label according to an aspect of the present invention.

FIG. 1 illustrates an electronic shelf label (ESL) 100 according to an aspect of the present invention. The ESL 100 includes a display screen 102, a processor 104, a clock 106, a memory 108, a communication interface 110 and an antenna 112. The ESL 100 may include a pushbutton 113 for selecting display options, paging through successive display screens or otherwise accepting and acting on user inputs. The ESL 100 may include an internal power source such as a battery 114, or may alternatively receive power from an external source, such as a radio frequency (RF) field emitted by a communication base station (not shown in FIG. 1, but illustrated in FIG. 3 and discussed below).

The memory 108 may suitably be organized to include a plurality of registers, with registers falling into one of several different categories. Some categories of registers store information for display and use, and other categories of registers store information and commands used to control the operation of the ESL 100.

Figure 2:
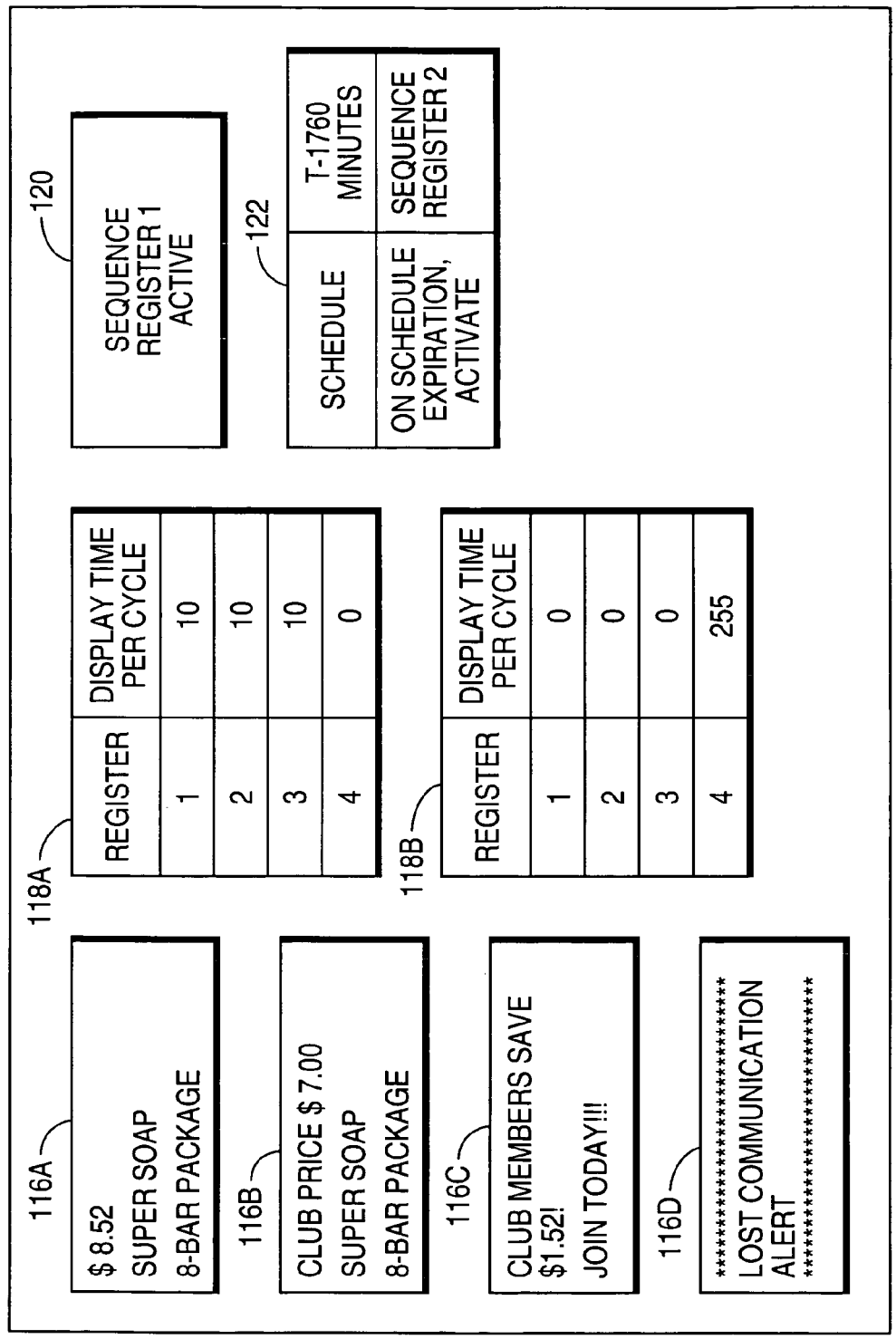
FIG. 2 illustrates a memory register map for an electronic shelf label operating according to an aspect of the present invention.

One category of registers may conveniently be referred to as data registers, used to store various elements of information for display and use. The register 116A stores price information and the registers 116B and 116C store additional product description information that can be selected for display. Most notably for the present discussion, the register 116D stores a lost communication indicator display, such as an icon, a specified text message or a blank screen. In the present case, the register 116D stores the text message "LOST COMMUNICATION ALERT", preceded and followed by rows of asterisks, as reflected on the display screen 102. The contents of the register 116D are not explicitly shown in FIG. 1, but are shown in FIG. 2.

Various control registers are populated with information that will cause specified actions to be taken upon occurrence of a specified condition, such as failure of the ESL 100 to receive communication specifically addressed to it during a predetermined time period. An example of an action to be taken is display of the message stored in the register 116D.

Other actions that may be contemplated include sounding of an alarm, illumination of an alert light or other similar actions.

Communication failures affecting an ESL frequently result from inadvertent removal of a record of the ESL from a database of ESLs operating in a system. Such an ESL may continue to receive messages broadcast generally to all ESLs, but will not receive messages, for example price update messages, addressed specifically to the ESL.

The control registers in the illustrated example include sequence registers 118A and 118B. The sequence registers 118A and 118B control the sequence and timing of the display of data stored in the registers 116A-116D. Other control registers include an active sequence register 120, which selects one of the sequence registers 118A or 118B to be active at any particular time and a scheduled sequence register 122 which loads designated information into the active sequence register at a time specified by the scheduled sequence register.

While display of a visual message is described above, it will be recognized that numerous alternatives exist for actions tending to call attention to an ESL with which communication has been lost and to render the ESL easily identifiable. Such actions include but are not limited to illumination of an LED, sounding of an audible message or various other actions or events. Any or all of these actions or events may be employed in addition or as an alternative to displaying an explicit message indicating a lost communication status.

FIG. 2 illustrates the memory 108 in greater detail, showing exemplary contents of the registers 116A-116D, 118A, 118B, 120 and 122. As noted above, the exemplary ESL 100 includes four display registers 116A-116D and two sequence registers 118A and 118B. The register 116A stores price display information including a product identification and price. The register 116B includes alternative price information for the same product. In the example shown, the alternative price is a club price, incorporating a discount for use of the retailer's loyalty program. The register 116C stores an advertising message, such as the illustrated message "Club members save $1.52! Join today!!!", and the register 116D stores the lost communication indicator.

The choice and timing of actions to be taken by the label 100, such as display of information, is controlled by the sequence registers 118A and 118B. In the illustrated example, each of the registers 118A and 118B stores a set of time values. One time value is associated with each data register, and indicates the length of time, expressed as a number of cycles, that the information stored in the register is to be displayed. Displays occur in a sequence. Each register is displayed for the specified length of time and then the sequence repeats.

As illustrated in FIG. 2, the register 118A stores the time values 10, 10, 10 and 0, indicating that the contents of the registers 118A-118C are to be displayed for 10 cycles each, with 10 cycles commonly amounting to approximately 2.5 seconds in commonly used programming for ESLs similar to the ESL 100. The contents of the register 118D are to be displayed for 0 cycles, or, in other words, are not to be displayed. The register 118B stores the time values 0, 0, 0 and 255, indicating that the communication failure indicator is to be essentially continuously displayed. The contents of the ESL 118D are to be displayed for the maximum available period during each sequence, and the contents of the ESLs 118A-118C are not to be displayed.

At any particular time, the current active sequence register 120 indicates which of the sequence registers 118A or 118B is controlling the information displayed by the ESL 100. In the present example, the register 120 stores the selection number "1," indicating that the first sequence register, 118A, is controlling the display. If the contents of the register 120 change, so that the selection number "2" is stored, the register 118B will control the display and the communication failure indicator will be displayed. A change in the contents of the register 120 may be accomplished, for example, by a command received from a communication base station.

Changes in the contents of the current active sequence register 120 may also be accomplished through scheduling, and it is through scheduling that the register 120 will typically be changed in order to select the register 118B as the active sequence register. The ESL 100 includes a scheduled sequence register 122, which stores information setting a scheduled action for selecting the sequence register 118B as the active sequence register. The register element 124A stores a time at which the action is to be executed, and the register element 124B stores a "2", indicating that the scheduled selection is the second sequence register, that is, the register 118B. At the time stored in the register element 124A, the value "2" stored in the register element 124B is transferred to the register 122, setting the second sequence register 118B as the active sequence register and causing the display of the lost communication indicator. The contents of the scheduled sequence register 122, as well as of any other register, may be determined by transmissions received from a communication base station. In normal operation, the register element 124A, storing the scheduled time for switching of the active sequence register, will be updated periodically by a transmission from a communication base station, with each update pushing the scheduled time into the future. For example, if the scheduled time is chosen as two days from the last update, and the register element 124A is updated daily, the scheduled time is pushed back one day with each update. Thus, unless communication is lost, the ESL will be updated so that the scheduled time for displaying the lost communication indicator will never arrive and the lost communication will never be displayed. The transmission updating the scheduled time will be specifically addressed to the ESL 100 and will not be part of a general broadcast not directed to specific ESLs.

The hardware components of the ESL 100 may suitably be similar to that of generally available ESLs, and any suitably designed ESL may be configured to operate in a way similar to that described above by loading appropriate data and commands into appropriate registers of the ESL. For example, if an already installed system uses ESLs capable of receiving and storing suitable data and commands, the ESLs may be configured to operate in a way similar to that of the ESL 100 of FIGS. 1 and 2 simply by transmitting appropriate data and commands to the ESLs for storage in appropriate registers. It will be recognized, however, that numerous alternative techniques and configurations of hardware may be contemplated for carrying out the teachings of the present invention. For example, as an alternative to storing a scheduled display of the lost communication message and then updating the schedule, an ESL may be designed or programmed to detect each successful occurrence of a communication. The ESL may be programmed to display a lost communication message if no communication occurs within a specified time period and to automatically reset the scheduled time period if a communication specifically addressed to the ESL is detected during that time.

Figure 3:
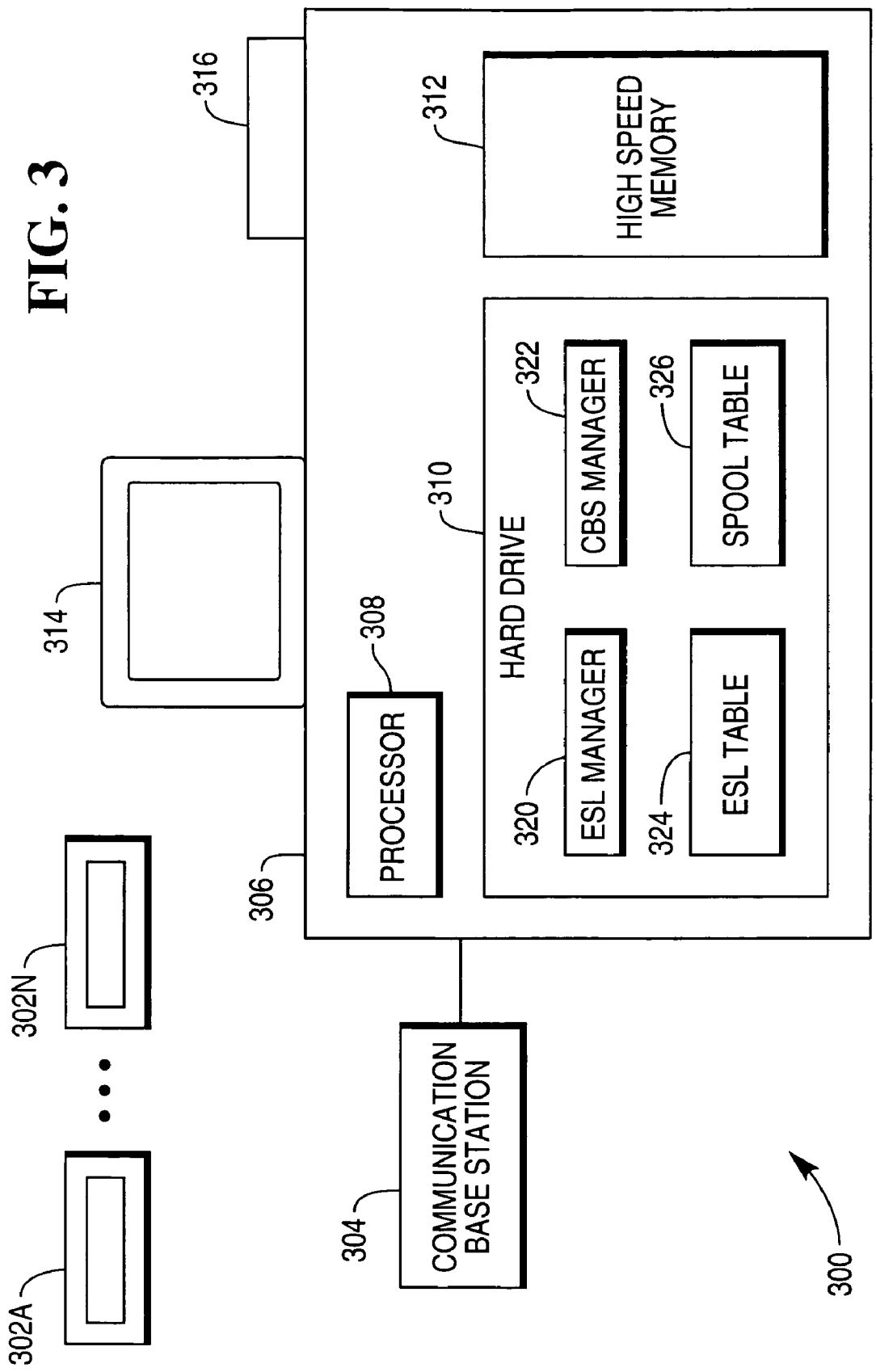
FIG. 3 illustrates an electronic shelf label system according to an aspect of the present invention.

FIG. 3 illustrates an ESL system 300, including a plurality of ESLs 302A, . . . ,302N. The ESLs 302A, . . . ,302N may suitably be similar in design and programming to the ESL 100. The system 300 also includes a communication base station (CBS) 304 for transmitting data and commands to and receiving information and responses from the ESLs 302A, . . . ,302N and a server 306 for managing operation of the communication base station 304. Only one communication base station 304 and one server 306 are illustrated here, but a typical installation may have thousands of ESLs such as the ESLs 302A, . . . ,302N, and several communication base stations such as the communication base station 304, each communication base station being assigned to a specified group of ESLs. A system may also include multiple servers such as the server 306. The teachings of the present invention may easily be adapted to systems including any number of ESLs, communication base stations and servers.

The server preferably includes a processor 308, permanent storage such as a hard drive 310, high speed memory 312, display 314 and keyboard 316. The server 306 also includes a communication interface 318 for controlling the communication base station 304.

The server 306 suitably operates under the control of an ESL manager 320 and a communication base station manager 322, using data from an ESL table 324. The ESL table 324 stores the serial number of each ESL, and may suitably store information such as status and stored data images for each ESL. The data images may include images of the data presently stored in the ESL, as well as images of data to be transmitted to the ESL. The data images to be transmitted may be associated with a scheduled time for transmission.

The ESL manager 320 transmits messages to the ESL, and also monitors and maintains an action list for the ESLs using spool tables such as the table 326. A spool table is a list or sequence of actions to be performed as processor resources come available to perform the actions. Actions to be taken may include updating an ESL's information, requesting status updates and other actions required for the operation of the system 300. In order to communicate with one of the ESLs 302A, . . . ,302N, the ESL manager 320 prepares a message and requests transmission by the CBS manager 322, which formats a communication for transmission to the ESL and directs the communication to the CBS 304.

In order to insure that an ESL will display the lost communication message if communication has been lost, but will not display the message otherwise, the ESL manager 320 suitably initializes each of the ESLs 302A, . . . ,302N at the time the ESL is installed. Each of the ESLs 302A, . . . ,302N is preferably similar in design and construction to the ESL 100. Each of the ESLs includes data registers similar to the registers 116A-116D of FIG. 1. Each ESL may have as many data registers as needed, with the data registers of each ESL being loaded with information needed by that ESL. Each of the ESLs also includes sequence registers similar to the registers 118A and 118B of the ESL 100 of FIG. 1. Each ESL may have as many sequence registers as needed, with each sequence register storing data for a desired display sequence. However, each of the ESLs 302A, . . . ,302N will include a register similar to the register 116D of FIG. 1, dedicated to storage of the lost communication display. For convenience, this register will be referred to as the lost communication data register. Similarly, each of the ESLs 302A, . . . ,302N will also include a sequence register similar to the register 118B of FIG. 1. This may be conveniently referred to as the lost communication sequence register.

The ESL manager 320 requests a transmission to each ESL to load the lost communication data into the lost communication data register of the ESL and the lost communication sequence into the lost communication sequence register of each ESL. Loading may be accomplished at any time desired. For example, the data may be loaded when an ESL is first installed in the system 300 or when the system 300 as a whole first begins operation. Additionally, a transmission loading the data may be prepared and transmitted to each ESL at scheduled times, to guard against corruption or loss of the data by an ESL and to make sure that the proper data is present.

Each of the ESLs 302A, . . . ,302N suitably includes an active sequence register and a scheduled sequence register similar to the registers 120 and 122 of FIG. 1, respectively. At a suitable time, such as installation of an ESL, initialization of the system 300 or periodically according to a schedule, the ESL manager 320 prepares a transmission request to store a scheduled action in the scheduled sequence register of each ESL. The request schedules a selection of the lost communication sequence register as the active register, and sets a suitable time for the selection, such as two days from the date of the request. The ESL manager 320 also prepares transmissions to the ESLs and interprets responses and messages from the ESLs as needed to manage the system 300.

The ESL manager 320 periodically prepares transmissions to all ESLs to update the stored sequence register of each ESL, so as to update the scheduled time for selection of the lost communication sequence register as the active sequence register. Each such transmission is suitably specifically addressed to an ESL, in order to distinguish it from generally broadcast transmissions that are not specifically directed to any ESL, but instead are simply to all ESLs within range. The update sets the scheduled time further into the future. The update occurs before the scheduled occurrence of the selection, so that the selection does not occur for any ESL with which communication is being successfully carried out. However, if communication with any ESL is lost, for example if identification of an ESL is inadvertently removed from the ESL table 324, the stored scheduled time for selection of the lost communication sequence register will not be updated and the selection will occur as most recently scheduled. It will be recognized that the above described identification of ESLs with which communication has failed can be implemented in already installed systems and does not require any special hardware configuration of the ESL, so long as each ESL with which the above described embodiment of the invention is used includes registers that can receive data and that supports the scheduling of actions and the updating of the scheduled actions as described above.

FIG. 4 illustrates a process 400 of identifying labels with which communication has been lost, according to an aspect of the present invention. The process 400 may suitably be carried out using a system such as the system 300 of FIG. 3, with electronic shelf labels similar to the label 100 of FIG. 1.

At step 402, a plurality of electronic shelf labels are programmed with an action to be executed on loss of communication, together with programmed instructions that will have the effect of causing the execution of the action if communication with the label is lost. Programming of the action and the instructions may suitably be accomplished by a message to each label transmitted from a central communication device such as one or more communication base stations. Suitably, the programmed instructions will cause execution of the action after expiration of a scheduled time period if the instructions are not updated before expiration of the scheduled time period. At step 404, the instructions for execution of the lost communication action are periodically updated so as to reschedule the execution of the action to a time further in the future and thus to prevent display of the message by labels with which communication can be performed. At step 406, upon failure to communicate with a label during before the expiration of the scheduled time for execution of the lost communication action, the scheduled time expires and the action is executed by the label with which communication has not occurred within the scheduled time.

While the present invention is disclosed in the context of a presently preferred embodiment, it will be recognized that a wide variety of implementations may be employed by persons of ordinary skill in the art consistent with the above discussion and the claims which follow below.

I claim:

1. An electronic shelf label, comprising:
a memory for storing one or more of a plurality of actions to be taken by the label, the memory comprising a plurality of registers including sequence registers for storing timing sequences for controlling actions to be taken, one or more of the available actions including lost communication actions calling attention to the label if communication between the label and an electronic shelf label communication base station is lost, at least one of the sequence registers being a lost communication sequence register directing execution of the lost communication action; and
a processor for selecting the actions to be taken by the label, the processor being operative to select the lost communication action by selecting the lost communication sequence register as an active sequence register if no communication specifically addressed to the label is received by the label during a specified time.

2. The label of claim 1, wherein the lost communication actions include display of a lost communication message and wherein the label further includes a display screen for displaying a message.

3. The label of claim 2, wherein at least one lost communication sequence register specifies a predetermined nonzero time duration for display of the lost communication message.

4. An electronic shelf label, comprising:
a memory for storing one or more of a plurality of actions to be taken by the label, one or more of the available actions including lost communication actions calling attention to the label if communication with the label is lost;
a processor for selecting the actions to be taken by the label, the processor being operative to select the lost communication action if no communication specifically addressed to the label is received by the label during a specified time, wherein the memory comprises a plurality of registers, the registers including sequence registers for storing timing sequences for controlling actions to be taken, at least one of the sequence registers being a lost communication sequence register directing execution of a lost communication action, and wherein the lost communication sequence register is selected as an active sequence register if no communication specifically addressed to the label is received by the label during a specified time, wherein the lost communication actions include display of a lost communication message and wherein the label further includes a display screen for displaying a message, wherein at least one lost communication sequence register specifies a nonzero time period during which the lost communication message is to be displayed; and
a scheduled sequence register storing a selection of one of the sequence registers as active, and wherein the scheduled sequence register stores a selection of the lost communication sequence register as an active sequence register along with a schedule for executing the selection of the lost communication sequence register as active.

5. The label of claim 4, wherein the label is further operative to periodically receive an updated schedule for selection of the lost communication sequence register as active.

6. The label of claim 5, wherein the label is operative to receive the updated schedule for selection of the lost communication sequence register as active in a communication specifically addressed to the label.

7. The label of claim 6, wherein the label is operative to receive the updated schedule for selection of the lost communication register as active at a time prior to the most recently updated scheduled time for selection of the lost communication sequence register as active.

8. A communication controller for managing communication with an electronic shelf label, comprising:
a communication interface for communicating messages and commands to be transmitted to the label and receiving responses passed from the electronic shelf labels; and
a processor for preparing messages and commands to be transmitted to the electronic shelf labels, the processor being operative to transmit a lost communication action for execution by the electronic shelf label and to transmit a command specifying a time at which execution of the lost communication action will occur if communication specifically addressed to the label is not received by the label before the specified time.

9. The communication controller of claim 8, wherein the lost communication action includes an action by the label calling attention to the label.

10. The communication controller of claim 9, wherein the lost communication action includes display of a lost communication message.

11. The communication controller of claim 10, wherein the processor is operative to issue a command to the label scheduling execution of the lost communication action at the specified time and, periodically thereafter and before the specified time, to issue a new command rescheduling execution of the lost communication action to a new and later specified time.

12. The communication controller of claim 9, wherein the processor is operative to direct transmission of a lost communication message to the label for storage in a display register of the label, wherein the processor is further operative to direct transmission to the label of a time sequence for storage in a lost communication sequence register of the label, the time sequence calling for display of the lost communication message, and wherein the processor is further operative to direct transmission of a scheduled sequence for storage in a scheduled sequence register, the scheduled sequence directing selection of the lost communication sequence register as an active sequence register at a specified time.

13. The communication controller of claim 12, wherein the processor is operative to periodically transmit to the label an updated scheduled sequence rescheduling selection of the lost communication sequence register to a new specified time later than a time specified by the most recently updated scheduled sequence.

14. A method of identification of an electronic shelf label with which communication has been lost, comprising the steps of:
   programming an electronic shelf label with a lost communication action; and
   programming the electronic shelf label to execute the lost communication action if a command specifically addressed to the label is not received by the label before a specified time, programming the electronic shelf label to execute the lost communication action comprising transmitting a lost communication time sequence to the label directing a time sequence for execution of the lost communication action and transmitting a command scheduling selection of the lost communication time sequence so as to cause selection of the lost communication time sequence as an active sequence if a message specifically addressed to the label does not occur before the specified time by periodically transmitting a command updating the specified time at which selection of the lost communication time sequence as active will occur, transmission of the command updating the specified time occurring before the most recently updated specified time.

15. The method of claim 14, wherein transmission of the command updating the specified time is specifically addressed to the label.

16. The method of claim 15, wherein the lost communication action is display of a lost communication message.

17. The method of claim 16, wherein the time sequence for execution of the lost communication action is a time sequence directing continuous display of the lost communication message.

* * * * *